United States Patent [19]

Debnam, Jr. et al.

[11] Patent Number: 4,785,608
[45] Date of Patent: Nov. 22, 1988

[54] AMPOULE SEALING APPARATUS AND PROCESS

[75] Inventors: William J. Debnam, Jr.; Ivan O. Clark, both of Hampton, Va.

[73] Assignee: The United States of America as represented by the Administrator of the National Aeronautics and Space Administration, Washington, D.C.

[21] Appl. No.: 393,567

[22] Filed: Jun. 30, 1982

[51] Int. Cl.⁴ ............... B65B 31/04; B65B 31/06; B65B 51/20; B65B 1/04
[52] U.S. Cl. ............... 53/432; 53/433; 53/478; 53/486; 53/489; 53/510; 53/511; 53/319; 53/330; 53/373
[58] Field of Search ............... 53/88, 89, 471, 478, 53/97, 489, 319, 511, 403, 373, 405, 408, 433, 432, 477, 510, 266 B, 330, 264, 328, 189, 264; 65/36, 38, 39, 32, 34, 270, 138–139, 155; 174/17.05, 50.58, 50.5; 215/32–33, 35

[56] References Cited

U.S. PATENT DOCUMENTS

| 264,039 | 9/1882 | Klee | 53/264 |
| 703,870 | 7/1902 | Weed | 53/264 |
| 807,080 | 12/1905 | Keenan | 53/264 |
| 982,860 | 1/1911 | Peelle | 53/109 |
| 1,410,741 | 3/1922 | Erdle | 53/467 |
| 1,726,111 | 8/1929 | Loewe | 53/264 X |
| 2,198,752 | 4/1940 | Barr | 53/510 X |
| 2,649,993 | 8/1953 | Burdick et al. | 65/34 X |
| 2,694,273 | 11/1954 | Spyut | 53/478 |
| 3,409,342 | 11/1968 | Anderson et al. | 65/34 |

FOREIGN PATENT DOCUMENTS 603585 4/1960 Italy .................... 53/264

Primary Examiner—Horace M. Culver
Attorney, Agent, or Firm—George F. Helfrich; John R. Manning; Charles E. B. Glenn

[57] ABSTRACT

An apparatus 10 for effecting sealing of a fused quartz ampoule 24 while maintaining a vacuum on the ampoule via system 12 is disclosed. A plug 28 of fused quartz is lowered into the vertically disposed ampoule 24 (while maintaining the vacuum thereon) and heat sealed therein to prevent any vapor escape from, or contamination of, the contained semiconductor growth charge 29 during subsequent semiconductor crystal growth processes. A rotary vacuum feed-through mechanism 16 selectively rotates axle 34 and spool 32 to unwind wire 30 for lowering of plug 28 into the reduced diameter portion 24b of ampoule 24. Ampoule 24 is hermatically connected to vacuum housing 18 by quick release flange 20 wherein O-ring 22 retains ampoule 24.

7 Claims, 1 Drawing Sheet

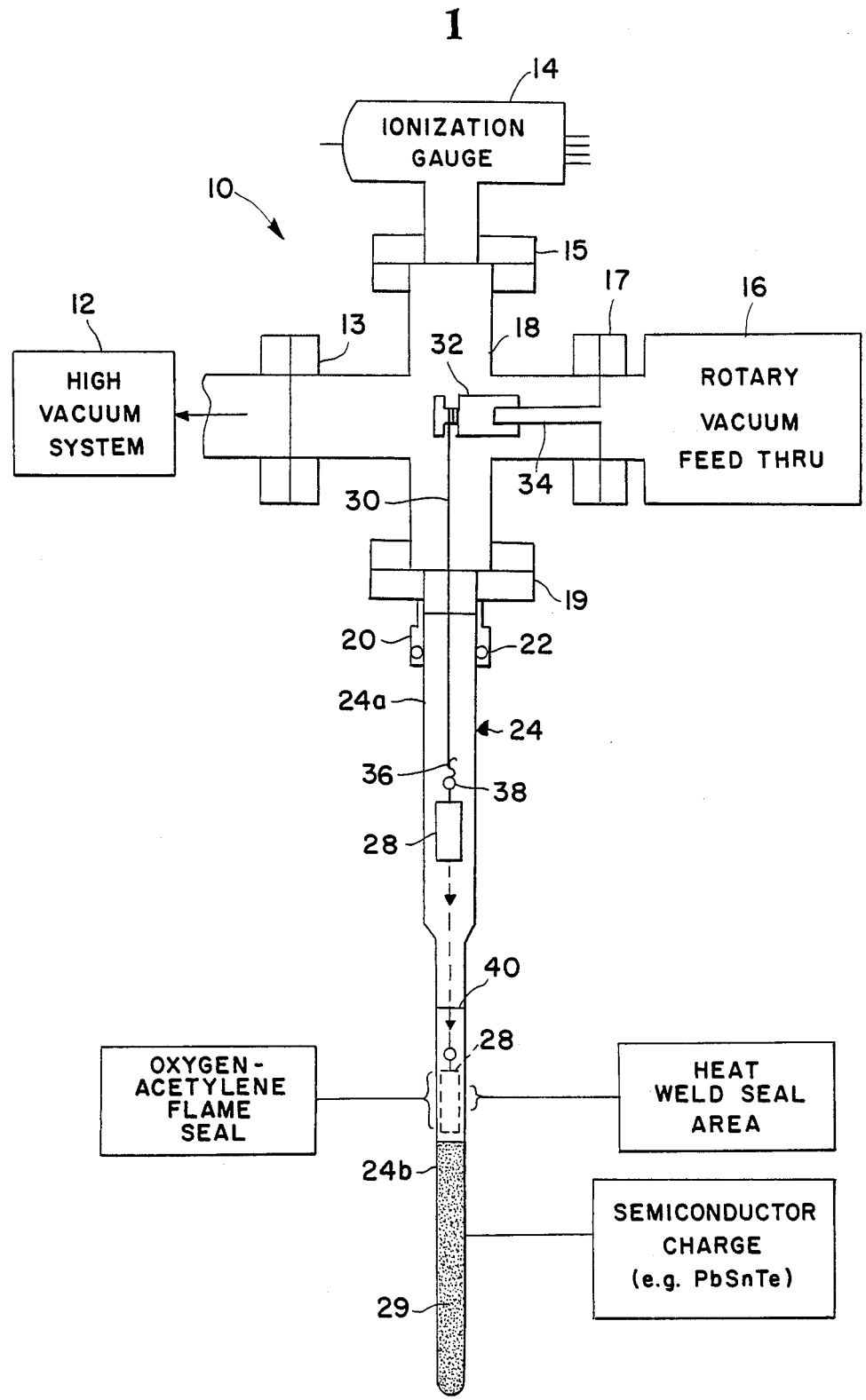

AMPOULE SEALING APPARATUS AND PROCESS

ORIGIN OF THE INVENTION

The invention described herein was made by employees of the United States Government and may be used by or for the Government for governmental purposes without the payment of any royalties thereon or therefor.

BACKGROUND OF THE INVENTION

In the growth of amorphous and crystalline semiconductor materials, it is frequently desirable to employ a sealed ampoule in order to protect exposed areas of the furnace from any corrosive vapors evolved and/or to prevent a change in the composition of the semiconductor charge due to preferential vaporization of one or more of its components and/or to prevent contamination of the semiconductor charge by the external environment. Representative semiconductor materials are doped and undoped germanium (Ge); III-V's such as GaAs, InP, and GaAlAs; and II-VI's such as PbTe, PbSnTe, HgCdTe, and GeTe. Semiconductors of these sorts are commonly processed in sealed ampoules by the Bridgman, quench-anneal, or vapor crystal growth process. A growth ampoule having the desired features for use in these processes, and particularly for the growth of lead-tin-telluride and and germanium doped with gallium, has been constructed for use with the present invention from fused quartz. The unique seal and process for sealing these charged fused quartz ampoules forms the subject matter of the present invention.

In summary, the current needs of semi-conductor developers are to be able to produce precisely controlled compositions, free of unknown contaminations, sealed in vacuum containers, which are structurally robust as related to shock or pressure, and which can be subjected to wide temperature ranges without losing structural integrity nor causing composition contamination. To meet these needs, it is necessary to simultaneously control distortion of the container ampoule, control the precise amount of "trapped" atmosphere within the ampoule, control of any contaminant emission during the assembly, and control of outgassing during the annealing cycle. In addition, it is required that the volume of the ampoule be variable, subject to the above constraint of precise repeatability, for the purpose of allowing changes in the semi-conductor charge. Further, no portion of the completed ampoule can be allowed to produce internal contaminants due to vaporization or otherwise during the high temperature, low pressure semi-conductor growth cycles.

It is therefore an object of the present invention to provide a novel process for sealing charged semiconductor growth ampoules.

Another object of the present invention is a process for sealing evacuated containers while maintaining the vacuum therein.

A further object of the present invention is a process for sealing fused quartz ampoules with a quartz plug.

An additional object of the present invention is to provide a sealed charged fused quartz ampoule for use in growing semiconductor crystals.

Another object of the present invention is to provide an apparatus for precision sealing of an ampoule while maintaining a vacuum in the ampoule.

An additional object of the present invention is an apparatus for precision sealing of a fused quartz ampoule.

BRIEF DESCRIPTION

According to the present invention, the foregoing and additional objects are attained by providing an elongated fused quartz ampoule having a pair of stepped diameter portions with the larger diameter portion being at the open end and a semiconductor charge disposed in the reduced diameter portion. The ampoule is vertically retained in a vacuum assembly with a quartz plug of substantially the same diameter as the reduced diameter portion being suspended within the larger open end of the ampoule and, after evacuation of the ampoule, the plug is lowered into the reduced diameter portion for sealing thereof. The suspension and positioning of the plug is facilitated by a rotary spool and platinum wire connection to the plug. The sealing process is accomplished, while maintaining the ampoule vacuum, by an oxygen-acetylene torch heat treatment of the ampoule wall adjacent the plug. This heat treatment is in the range of 1200°–1400° C. and causes softening of the quartz material with the vacuum influencing inward collapse of the ampoule wall for contact and fusing with the plug. Thereafter, the ampoule is heated to weld temperature (approximately 1800° C. to 2000° C.) in the plug region to effect the final seal.

BRIEF DESCRIPTION OF THE INVENTION

A more complete appreciation of the invention and many of the attendant advantages thereof will be readily apparent as the same becomes better understood by reference to the following detailed description when considered in connection with the accompanying drawing wherein:

The single FIGURE is a part schematic, part sectional view of the vacuum system and sealing apparatus employed in the present invention.

DETAILED DESCRIPTION OF THE INVENTION

Referring now to the drawing, the vacuum system and sealing apparatus employed in the present invention is shown and generally designated by the reference numeral 10. Apparatus 10 includes a high vacuum pump system 12, ionization guage 14 and a rotary vacuum feed-through mechanism 16 each of which are in sealed connection with a four-chambered housing 18 via respective sealed flanged joints or collars 13, 15 and 17. An additional sealed flanged joint 19 serves to connect a quick disconnect flange 20 to the remaining chamber of housing 18.

The quick disconnect flange 20 is of tubular configuration and houses an O-ring assembly 22 in one end with the other end being secured to joint 19. An elongated ampoule 24 is slidably received within the end of flange 20 having O-ring 22 therein and hermetically sealed to chambered housing 18 by the O-ring 22. Ampoule 24, in the preferred embodiment, is formed of fused quartz and is of stepped configuration. The open end portion 24a, of ampoule 24 is received by flange 20 and is of a larger diameter than the closed end portion 24b. A semiconductor charge 29 is disposed within reduced diameter portion 24b and is adapted to be sealed therein for subsequent growth of semiconductor crystals.

A cylindrical plug 28 serves to seal charge 29 within reduced diameter portion 24b of ampoule 24 as will be further explained hereinafter. Prior to sealing, plug 28 is maintained suspended within enlarged diameter area 24a of ampoule 24 via a thin platinum wire 30 extending from rotatable spool 32. An axle 34 serves as the rotative connection of spool 32 with the rotary vacuum feed-through mechanism 16. Wire 30 is provided with a hook 36 for attaching to an eye 38 integrally secured to plug 28.

OPERATION

The operation of the present invention is now believed apparent. A semiconductor charge from which it is desired to grow semiconductor crystals, e.g., PbSnTe, PbSnSe, Ga-doped Ge or the lke, is positioned within the reduced diameter portion 24b of quartz ampoule 24 with suitable spacers (not shown) provided therein when desired. Prior to insertion of charge 29, the entire quartz ampoule 24 and plug 28 are chemically cleaned, etched, and baked out at 1100° C. in a vacuum furnace to remove any contamination or adsorbed layers from the surface therein and to anneal the fused quartz ampoule. After cooling to ambient and loading with charge 29, ampoule 24 is connected to assembly 10 via the quick disconnect flange 20 with O-ring 22 therein assuring an hermetical sealing. Plug 28, being attached to the 0.1 mm platinum wire 30 via hook 36 and eye 38, is suspended within the enlarged diameter portion 24a of ampoule 24. Adequate clearance is provided around plug 28 in this position to substantially unhinder evacuation of ampoule 24 by vacuum system 12. When a vacuum of $10^{-7}$ to $10^{-8}$ Torr is achieved in the apparatus 10, as indicated by ionization gauge 14, rotary vacuum feed through mechanism 16 is activated to effect controlled rotation of axle 34 and attached spool 32 causing wire 30 to be unwound therefrom. The unwinding of wire 30 lowers plug 28 (as noted by the dotted lines) to a position within reduced diameter portion 24b of ampoule 24. While maintaining the vacuum, an oxygen-acetylene torch is applied to an area around the reduced portion of ampoule 24 and adjacent plug 28 to increase the temperature of the ampoule and plug areea to the range of 1200°-1400° C., thereby effecting softening of the fused quartz components in this area and, due to the influence of the vacuum within ampoule portion 24b, the walls thereof collapse to an intimate contact fuse with plug 28. This plug contact procedure is normally accomplished within 3-5 minutes. After plug contact procedure the ampoule area adjacent plug 28 is heated to the temperature range of 1800° C. to 2000° C. for 5-10 minutes to heat weld the outer plug surface area to the interior of ampoule portion 24b. The sealed ampoule is then ready for semiconductor crystal growth by the Bridgman or other crystal growth process. This crystal growth is obtained by heating the charged ampoule to the temperature range of 450° C.-1150° C. over various lengths of time followed by a selected cooling process dependent upon the growth process. Wire 30 is easily removed from plug 28 by releasing hook 36 from eye 38. Reduced diameter portion 24b of ampoule 24 may be separated from the enlarged diameter portion 24a prior to the crystal growth process, if so desired. This separation is readily accomplished by circumferentially scoring the ampoule at point 40 and breaking the sealed portion 24b away from the enlarged diameter portion 24a.

In a specific embodiment of the present invention the reduced diameter portion 24b had an outside diameter of 12 mm, an inside diameter of 9 mm and a length of 20 cm while the enlarged diameter portion 24a was 15 cm long and had an outside diameter of 19 mm and an inside diameter of 16 mm. A charge of PbSnTe weighing 30-60 grams was disposed within portion 24b and the vacuum attained in apparatus 10 was in the range of $10^{-7}$ and $10^{-8}$ Torr. Plug 28 has an outside diameter essentially equal to the inside diameter of portion 24b, i.e., 9 mm, and a length of approximately 2 cm.

Although the invention has been described relative to specific embodiments thereof, it is not so limited and numerous variations and modifications thereof will be readily apparent to those skilled in the art in the light of the above teachings. For example, where dimensions and specific materials are employed these may be changed without departing from the spirit or scope of the invention and the described apparatus and process may be employed for vacuum sealing of any suitable ampoule or container constructed of diverse materials and containing diverse charges or objects.

Thus, the specific illustrations described herein are considered exemplary only and are merely representations of the preferred embodiment of the invention and are not to be considered as limitation thereon.

What is claimed as new and desired to be secured by Letters Patent of the United States is:

1. Means for precision sealing of an elongated ampoule and precision control of its contents after vacuum evacuation so as to achieve rapid production of precisely repeatable samples comprising in combination:
   an ampoule having contents to be utilized under sealed vacuum therein and having an open end for receiving these contents therein,
   said ampoule being provided with a first diameter portion at the open end thereof and a reduced diameter portion at the other end with the ampoule contents being disposed in the reduced diameter portion,
   means for retaining said ampoule in a vertical open end up position,
   means for evacuating said ampoule,
   plug means for sealing said ampoule,
   retention means for releasably maintaining said plug means adjacent the ampoule open end while said ampoule is evacuated,
   positioning means for inserting said plug means into said ampoule while the vacuum therein is retained,
   heat sealing means for sealing said plug in position in said ampoule,
   said ampoule and said plug means being constructed from fused quartz, and whereby the sealed ampoule is a homogeneous and continuous unit at the sealed portion thereof.

2. Apparatus as in claim 1 wherein said plug means is suspended within the first diameter portion of said ampoule during initial vacuum evacuation thereof by said retention means and said retention means including an elongated wire having a hoot at one end thereof for connecting to said plug and means on said plug for receiving said hook
   said means on said plug for receiving said hook being an eye integral with, and of the same composition as, said plug.

3. Apparatus as in claim 2 wherein said elongated wire has the end thereof opposite to said hook secured to said positioning means, said positioning means including a rotatable spool for receiving said wire and means for selectively rotating said spool to position said plug within said ampoule.

4. A method for evacuating and sealing a charged fused quartz ampoule after evacuation and while maintaining vacuum pressure on the ampoule comprising:

providing a fused quartz ampoule having a sealed reduced diameter end portion and an open end enlarged diameter portion and having a charge disposed within the reduced diameter portion;

maintaining the fused quartz ampoule in a vertical position with the open end thereof up;

suspending a fused quartz plug having the same composition as the fused quartz ampoule for sealing the reduced diameter charged portion within and spaced on all sides from the open enlarged diameter portion;

evacuating the ampoule and, while maintaining the vacuum, positioning the plug within the reduced diameter portion and heating the area of the ampoule containing the plug to the fusion or weld temperature of the ampoule and plug; and thereafter cooling the heated portion to ambient temperature to recover a sealed evacuated charged ampoule.

5. The method of claim 4 including an elongated wire having one end secured to a rotary spool and the other end having a hook attached thereto releasably connect to the plug and rotating the spool to selectively position the plug within the ampoule.

6. The method of claim 5 including an eye formed on the plug for receiving the hook and releasing the hook from the eye after positioning the plug within the charged portion of the ampoule.

7. The method of claim 6 wherein the hook and eye are of the same fused quartz composition as the plug and ampoule.

* * * * *